United States Patent [19]
Grimm et al.

[11] Patent Number: 5,828,843
[45] Date of Patent: Oct. 27, 1998

[54] OBJECT-ORIENTED METHOD FOR MATCHING CLIENTS TOGETHER WITH SERVERS ACCORDING TO ATTRIBUTES INCLUDED IN JOIN REQUEST

[75] Inventors: Stephen M. Grimm, Mountain View; Jeffrey J. Rothschild, Los Gatos; Daniel J. Samuel, Sunnyvale; Michael A. Wolf, Mountain View, all of Calif.

[73] Assignee: Mpath Interactive, Inc., Mountain View, Calif.

[21] Appl. No.: 822,289

[22] Filed: Mar. 20, 1997

Related U.S. Application Data

[60] Provisional application No. 60/013,812 Mar. 21, 1996.
[51] Int. Cl.$^6$ ..................................................... G06F 16/16
[52] U.S. Cl. ................. 398/200.58; 463/42; 395/200.34; 395/200.53
[58] Field of Search .......................... 395/200.34, 200.56, 395/200.57, 200.58, 200.78, 200.35, 200.36, 200.37, 200.5, 200.52, 200.53, 200.54, 200.55, 200.68, 200.69, 200.33; 463/42

[56] References Cited

U.S. PATENT DOCUMENTS

| | | | |
|---|---|---|---|
| 4,521,014 | 6/1985 | Sitrick | 273/1 GC |
| 4,570,930 | 2/1986 | Matheson | 273/1 E |
| 4,572,509 | 2/1986 | Sitrick | 273/85 G |
| 4,811,199 | 3/1989 | Kuechler et al. | 364/200 |
| 4,856,787 | 8/1989 | Itkis | 273/237 |

(List continued on next page.)

FOREIGN PATENT DOCUMENTS

| | | | |
|---|---|---|---|
| 0 481 770 A2 | 4/1992 | European Pat. Off. | G06F 1/00 |
| WO 93/23125 | 11/1993 | WIPO | A63F 9/22 |

OTHER PUBLICATIONS

"AT&T's VoiceSpan: A New Edge For Gaming . . . And More"and PF. Magic +AT&T +Sega=Edge 16, *Release 1.0*, Esther Dyson's Monthly Report, Apr. 18, 1994, pp. 4–7.

Fitzgibbons, P., "Telegaming: A Survey of On–Line Game Opportunities", *Softalk,* vol. 2, Mar. 1984, Cover sheet plus 4 pages beginning at p. 89.

(List continued on next page.)

*Primary Examiner*—Dinh C. Dung
*Attorney, Agent, or Firm*—Sterne, Kessler, Goldstein & Fox P.L.L.C.

[57] ABSTRACT

A network match making system and method is used to match users of a multi-user networked application. Each user is associated with a client computer connected to the network. Clients are selected based on attributes of their users, the clients, servers, and/or communication links. The network match maker works with three different forms of network applications: peer-to-peer, multiple clients to a single server, and multiple clients to multiple servers. In one late server binding method, a set of computer objects is created. The set of computer objects has a plurality of client instances of client computer programs together with a server instance of a server computer program selected from a set of server instances. A match maker receives from a first client instance a first request to be joined into the set of computer objects. The first request has first client attributes associated with the first client instance. The match maker selects a first server subset of the set of server instances in response to the first request based on the first client attributes and creates the set of computer objects consisting of the first client instance. The match maker augments the set of computer objects with a second client instance of a client computer program. In particular, the match maker receives from the second client instance a second request to be joined into the set of computer objects. The second request has second client attributes associated with the second client instance. The match maker removes a second server subset from the first server subset in response to the second request based on the second client attributes and adds the second client instance to the set of computer objects. Finally, a member of the second server subset is added to the set of computer objects based on attributes associated with each member of the set of computer objects.

18 Claims, 9 Drawing Sheets

U.S. PATENT DOCUMENTS

| | | | |
|---|---|---|---|
| 4,998,199 | 3/1991 | Tashiro et al. | 364/410 |
| 5,014,219 | 5/1991 | White | 364/513 |
| 5,021,943 | 6/1991 | Grimes | 364/200 |
| 5,083,271 | 1/1992 | Thacher et al. | 364/411 |
| 5,083,800 | 1/1992 | Lockton | 273/439 |
| 5,114,155 | 5/1992 | Tillery et al. | 273/371 |
| 5,187,790 | 2/1993 | East et al. | |
| 5,324,035 | 6/1994 | Morris et al. | 273/138 A |
| 5,329,619 | 7/1994 | Pagé et al. | |
| 5,341,477 | 8/1994 | Pitkin et al. | 395/200.33 |
| 5,350,176 | 9/1994 | Hochstein et al. | 273/148 B |
| 5,351,970 | 10/1994 | Fioretti | 273/439 |
| 5,359,510 | 10/1994 | Sabaliauskas | 364/410 |
| 5,367,635 | 11/1994 | Bauer et al. | |
| 5,422,883 | 6/1995 | Hauris et al. | 370/62 |
| 5,426,427 | 6/1995 | Chinnock et al. | 395/200.12 |
| 5,442,749 | 8/1995 | Northcutt et al. | |
| 5,491,797 | 2/1996 | Thompson et al. | 395/200.33 |
| 5,497,491 | 3/1996 | Mitchell et al. | 395/700 |
| 5,513,126 | 4/1996 | Harkins et al. | 364/514 A |
| 5,517,622 | 5/1996 | Ivanoff et al. | 395/200.13 |
| 5,522,044 | 5/1996 | Pascucci et al. | 395/200.06 |
| 5,524,253 | 6/1996 | Pham et al. | 395/800 |
| 5,547,202 | 8/1996 | Tsumura | 463/29 |
| 5,548,726 | 8/1996 | Pettus | 395/200.09 |
| 5,553,239 | 9/1996 | Heath et al. | 395/187.01 |
| 5,559,933 | 9/1996 | Boswell | 395/114 |
| 5,560,005 | 9/1996 | Hoover et al. | 395/600 |
| 5,560,008 | 9/1996 | Johnson et al. | 395/650 |
| 5,572,582 | 11/1996 | Riddle | 379/202 |
| 5,580,309 | 12/1996 | Piechowiak et al. | 463/16 |
| 5,586,257 | 12/1996 | Perlman | 463/42 |
| 5,586,937 | 12/1996 | Menashe | 463/41 |
| 5,590,360 | 12/1996 | Edwards | 395/800 |
| 5,593,349 | 1/1997 | Miguel et al. | 463/30 |
| 5,594,910 | 1/1997 | Filepp et al. | 395/800 |
| 5,600,833 | 2/1997 | Senn et al. | |

OTHER PUBLICATIONS

"Game Connection Pro", URL:*http:www.siriussoft.com/ Gameinfo.htm*, Date Unknown (Downloaded Jan. 22, 1988), 4 pages.

Keizer, G., "Dial–a–Duel", *Computer Shopper,* Jun. 1993, pp. 606–608.

"Modem Combat", *Compute,* Sep. 1994, Cover sheet plus 4 pages beginning at p. 86.

"Multiplayer Dot Com (Multiplayer Gaming Networks)", URL:*http://www.multiplayer.com/networks.html,* Copyright 1996, 1997, Downloaded Jan. 22, 1998, 8 pages.

"Multiplayer Dot Com (Tools)", URL:*http://www.multiplayer.com/tools.html,* Copyright 1996, 1997, Downloaded Jan. 22, 1998, 2 pages.

"OnLine Gaming", *PCGamer,* vol. 3, No. 5, May 1996, pp. 70 and 72.

Peterson, L.L., "A Yellow–Pages Service for a Local–Area Network", *Computer Communication Review (ACM Press Proceedings)*, Aug. 11–13, 1988, pp. 235–242.

Silverthorne, S., "Doom", *PCWeek,* vol. 11, No. 43, Oct. 31, 1994, pp. A/1, A/10 and A/12.

Keizer, G., "Playing the Field: OnLine gaming matches your wits against real opponents", *OMNI,* Mar. 16, 1993, p. 18.

Spear, P., "The OnLine Games People Play", *Compute,* Nov. 1991, Cover sheet plus 3 pages beginning at p. 96.

"Multiplayer Games with Graphical Interface", *Newmedia,* Nov. 1994, Cover sheet plus 2 pages including p. 63.

Cronin, D., "MUD Games on the Internet", *Dr. Dobb's Information Highway Sourcebook,* Winter 1994, pp. 22–25.

Alden, D., "Multi–Player Games: A New Feature for BBS Fans", *LinkUp,* vol. 7,No. 8, May 1984, pp. 2 and 34–36.

Fowler, D., "Treading the Boards", *Computer Shopper,* Aug. 1994, pp. 612–613.

James, R. and L. Sphinx, "Creating Your Own Multiplayer Game Systems", *Dr. Dobb's Information Highway Sourcebook.* Winter 1994, pp. 56–64.

Silverman, D., "Cyberspace arcade links 'Doom' fans", *Houston Chronicle,* Sep. 28, 1994, (2 pages).

"Online game sites compete for fans" and other links from *http://www.dwango.com,* Copyright 1997, Downloaded Jan. 22, 1998, (8 pages).

"Kesmai Launches Aries '96" and other links from *https:www.gamestorm.com,* Downloaded Feb. 11, 1998, (29 pages).

"Multiplayer Internet Gaming" and other links from *http://www.teleport.com,* Downloaded Jan. 22, 1998, (26 pages).

"Kali: IPX across the net", URL:*http://worldvillage.com/wv/gamezone/html/feature/mayhem/mayhem2.htm,* Downloaded Jan. 22, 1998, (4 pages).

"MGYP", URL:*http//www/azstarnet.com/~ruc/yellow/prime.htm,* Downloaded Jan. 22, 1998, (2 pages).

"On Line gaming", URL:*http://www.geocities.com/Research Triangle/5431/online.html,* (May 27, 1996), Downloaded Jan. 22, 1998, (3 pages).

"Multiplayer Database FAQ", URL:*http://www.crazyfox.com/multiplayer/faq.shtml,* Downloaded Jan. 22, 1998, (2 pages).

"The Internet Gaming Zone", URL:*http://www.zone.com/zonepromo/gamelist.asp,* Downloaded Jan. 22, 1998, (2 pages).

"Zarf's List of Interactive Games on the Web", URL:*http://www.leftfoot.com/games/html,* Downloaded Jan. 22, 1998, (3 pages).

"Recreation:Games:Internet Games: Interactive Web Games:Multi–User Games", URL:*http://www.yahoo.com/Recreation/Games/Internet_Games/Interactive_Web_Games/Multi_,* Downloaded Jan 22, 1998/(2 pages).

"Multiplayer Game", URL:*hhttp://www.lycos.com/wguide/wire/wire_867716_49646_2_0.html,* Jan. 21, 1998, (2 pages).

"Release 1.0", Esther Dyson's Monthly Report, Jun. 27, 1994, pp. 1–18.

5,828,843

OBJECT-ORIENTED METHOD FOR MATCHING CLIENTS TOGETHER WITH SERVERS ACCORDING TO ATTRIBUTES INCLUDED IN JOIN REQUEST

CROSS-REFERENCE TO RELATED PROVISIONAL APPLICATION

This patent application claims the benefit of U.S. Provisional application Ser. No. 60/013,812, filed on Mar. 21, 1996, now abandoned.

BACKGROUND OF THE INVENTION

Computer networks are widely used to connect multiple computer systems together for communicating and sharing information. Computer networks can also be used to implement multi-user applications that allow multiple users to share in the operation of a computer program. Common examples are video and teleconferencing applications, online multiplayer games which allow multiple users to play a game with one another and online chat environments. A problem common to all such multi-user network applications is providing an efficient way to bring together groups of users to join in the running of a multi-user application. Today, the known solutions deal only with the users requirements such as which other people they wish to be matched with. These solutions provide little more than manual methods for the users to select the other users that they wish to be matched with. This is workable only when there are reasonable numbers of users in the pool of all users. It becomes unworkable when there are large numbers of users and when the application has special requirements for network performance or capabilities of the client and/or server computer systems used to implement the application.

Networked applications for multiple clients exist in three forms. Peer-to-peer applications are executed by multiple client computers with no server or servers required. All communication traffic during the execution of the application is directed between the clients. Other multiple client networked applications use a single server system. The server may execute some portion of the application that is to be shared by all of the clients while the remainder of the application is executed on the clients. The server can also act as a communications collection point. Some or all of the communication traffic is between each of the clients and the server. The clients may additionally communicate with one another as needed. Finally, multiple servers may be used in a multiple client application. Similar to the case of a single server, a portion of the application may be executed on the servers. The multiple servers can also provide communications collection points for the clients.

SUMMARY OF THE INVENTION

In the present invention, a network match making system is used to create matched sets of users of a multi-user networked application. Each user is associated with a client computer connected to a network. Also on the network is a server computer which executes a software process that is the network match maker. In some implementations there are one or more additional servers that are also used for supporting the networked application. The clients are selected into matched sets based on attributes of their users, the clients, application class and instance, the attributes of the servers and the properties of the client-to-client and client-to-server communications links. The network match maker works with three forms of network application implementation: peer-to-peer, multiple clients to a single server and multiple clients to multiple servers.

The present invention presents a network match making system that solves the above described problems in the prior art and provides an automated means for users to be matched with one another for a networked application. The network match maker not only takes into account the users preferences and attributes, but the attributes of the client computer, the application, any optional servers needed by the application and the properties of the communications links between the clients and the clients and any optional servers.

These and other features and advantages of the present invention will become apparent from the following detailed description of the invention and accompanying drawings.

DETAILED DESCRIPTION OF THE INVENTION

Figure 1:
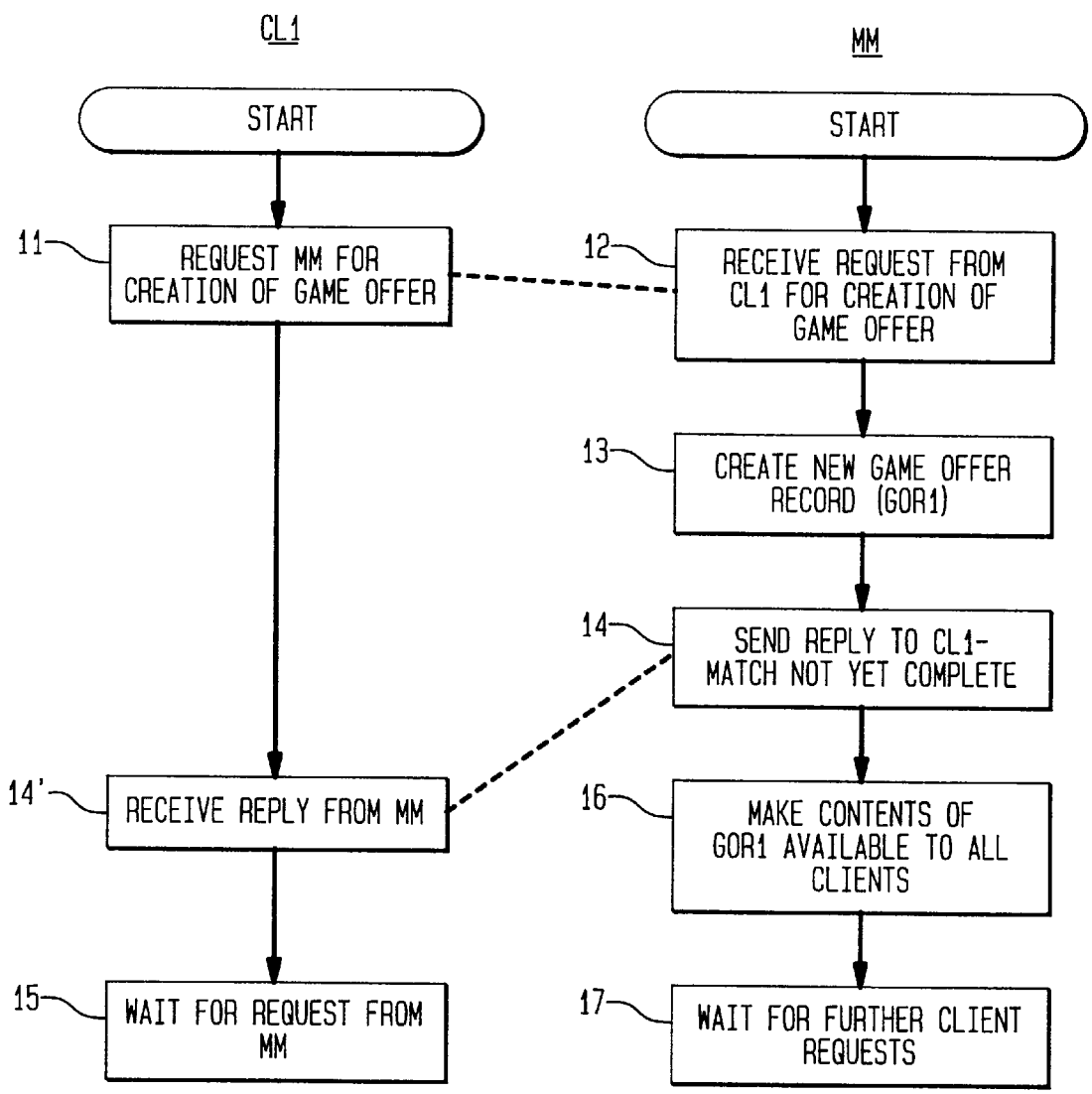
FIG. 1 is a flow chart showing the interaction between a first client and a match maker in accordance with the present invention.

The present invention involves a network match making process running on a server system on a network that is used by clients to be matched into matched sets of clients for a multi-user application. When the networked application operates in a networked system with multiple servers that may be used by the application, the network match maker also matches a server to the matched set of clients. A key idea behind the present invention is that clients and the server are matched not only on the basis of user attributes, but also on the basis of client, server and application attributes and on network performance characteristics including bandwidth, latency and packet loss.

Attributes

The network match maker matches clients and a server into matched sets by comparing the attributes of the user, the client, the server and the properties of the network links between them to the requirements of the application.

Client and user attributes

The user attributes include the obvious characteristics of the user that are relevant to the networked application. Some examples include things such as skill level, age, people the user doesn't want to be matched with. For the sake of a clearer discussion, the user and client attributes will be lumped into one group, and is referred to as "client attributes." Client attributes describe the capabilities of the client computer system. The performance of the client computer, the type and performance of its network link and the types and versions of the networked applications that are installed on it are all reasonable examples of client attributes.

Application attributes

The application attributes are the requirements of the networked application. Examples of these requirements include the type and performance of the client, the type and performance or any necessary server and the required properties of network links between the clients and between the clients and the server. Application attributes come in two forms, class and instance. The class attributes of an application apply to any instance of the application. The networked match maker operates in an environment where there will be multiple instances of each application. When an instance of an application is created, it inherits the class attributes while additional instance attributes may also be applied. These instance attributes may simply override some of the class attributes inherited by the instance, while others may be specific only to application instances.

Server attributes

Example of static server attributes include the type and performance of the server system, types and versions of any networked application software that is installed on the server. Dynamic attributes include the current load on the server. Considering the current load on the server when assigning application instances to a server is a way to effect dynamic load balancing on the servers in a multiple server system.

Communications attributes

Communications attributes are the properties of the network link between two computer systems. These will include the links between clients and links between clients and a server. The properties of network links will include the available bandwidth, the latency and the packet loss rate. Many networked applications will have certain minimum requirements for bandwidth and maximum requirements for latency. There are other metrics of communication performance that may be valuable measures of the properties of a communications link between two computer systems that also can be used.

Types of Matches

The network match maker forms matched sets of users by either automatically matching users into matched sets or allowing users to create match offers that other users may browse and then choose to join until full matched sets are completed. In both of these cases, the match maker will choose a server for the matched set if multiple servers are available and the networked application requires it. Automatic matching is a simple variant of user created match offers, so the user created match offer case is discussed first.

In both of these types of matches, there is the concept of a moderator. The moderator is the agent that chooses the instance attributes of a match offer. When the match offer is created, it inherits the class attributes of the application. The moderator may then modify the attributes to create the match offer instance attributes. When the application is launched for a match offer, it does so using the instance attributes of the match offer. In user created match offers, the most simple case is that the user that created the offer is the moderator. In automatic matches, the match maker itself is the moderator. Other possibilities exist. It is possible for some or all of the users in a match offer to share powers of the moderator. They may be able to override each others attribute choices so that the last setting of the attributes wins, or there may be a voting scheme between the users sharing moderator powers. It is also possible to imagine a mixture of match maker and user moderator powers. Some of the instance attributes might be set by the match maker and others by one or more users that join the match offer.

User Created Match Offers

Users may create their own specific offers to other users to match with. These are called match offers. To create a match offer, the user will choose one application for which to create a match offer. The offer will inherit the class attributes of the application, but the user may add additional instance attributes for their specific match offer. The user that created the original match offer will be considered the moderator of that offer and will be the only one that is able to select the instance attributes of the match offer. Other users will browse these match offers, examine their attributes, select an offer that they find acceptable and attempt to join that offer. The match maker will compare the client attributes and the communications attributes of any relevant communication links to the required instance attributes. If they do not match the required attributes of the match offer, the match maker will prevent the user from joining the match offer. If they do match, the new client will join the offer and will be added to the matched set of clients associated with the offer. As clients attempt to join the match offer, the match maker will also compare their attributes with those of the other clients to make sure that the user attributes are compatible before a client is allowed to join the match offer. Once enough clients have joined the match offer, the moderator can select to launch the application.

How the network match maker determines how the properties of any relevant communications links affect which clients can join a match offer depends on the architecture of the networked application and is described in the following sections.

Peer-to-peer

When the client requests to join a match offer, the network match maker will ask the new client to measure the properties of the communications links between the new client and all of the existing clients that already are members of the match offer. The properties of the communications links between the new client and the existing clients that are members of the match offer will be returned to the match maker in a vector of network properties. These properties will be compared to the requirements of the instance attributes for the match offer. The application will have its own class attributes for communications properties of the network links between the peers needed to run the application. The creator of the match offer may override these attributes to create instance attributes for the properties of the communications links between the peers. If the client attributes and the attributes of the communication links match the requirements of the application instance, the new client will be joined into the match offer.

Multiple clients to a single server

In this case, the server is assumed to have all of the necessary properties to host the necessary portions of the application. As with the peer-to-peer case when a client requests to join a match offer the network match maker will ask the new client to measure the properties of the communications links between the new client and all of the existing clients that already are members of the match offer. These properties will be returned to the match maker as a vector of communications properties which will be compared to the requirements of the application instance attributes for communications properties of client-to-client links. In this case the network match maker will also ask the new client to measure the properties of the communications link between the new client and the single server. The properties of this link are also matched to the instance attributes for communications properties of the client-to-server link. If all matches properly, the new client is allowed to join the match offer. In many multi-user networked applications that use a single server all client-to-client communications will be through the server, so there will be no direct client-to-client communications. In these cases, only the properties of the communications links from the clients to the server will be relevant.

Multiple clients to multiple servers

With multiple server systems, the situation becomes more complex. Not only must the system consider the properties of the communications links between the clients and the multiple servers, but additionally the attributes of the server systems. Not only must the network match maker match the clients into matched sets, it also must determine which of multiple server systems is to be associated with each matched set of clients. In the discussion here, it is assumed that the match maker will ultimately choose a single server to be matched with each matched set of clients associated with a match offer. The approach outlined here can be easily generalized to support applications that required multiple servers to be used when running a multi-user application. However, there are two server selection policies that the network match maker can use to select a specific server for a match offer called early server binding and late server binding.

When a client asks to join a match offer for a particular application, the network match maker asks the client to measure the properties of the communications links between itself, all of the other clients that are members of the matched set associated with the match offer and all of the server systems that are available for that application. The servers available for that application are a subset of all of the servers based on the attributes of the servers and the attributes for server requirements for the match offer instance. When a client creates a match offer they may specify instance attributes for the application that override or add to the application class attributes. This may further limit the subset of server systems that can support the application. When a new client requests to join the match offer, the network match maker will compare the client attributes to the required attributes of the match offer. If they match, the network match maker will then compare the properties of the relevant communications links to the requirements of the specific match offer.

With early server binding, the network match maker chooses the server from the qualified subset of servers using only the properties of the communications links between the creator of the match offer and the qualified servers. If multiple servers have communications links to the creator of the match offer that meet the requirements of the match offer, the network match maker will choose one based on some defined criteria. A reasonable criterion would be the best performance, but other criteria would be possible. As a new client attempts to join the match offer, the match maker compares the client attributes, the properties of the communications links between the new client and the existing members of the match offer and from the new client to the selected server. If all of these attributes and communications properties meet the requirements of the match offer, the client is allowed to join. While early server binding is the simplest server selection policy, it may not always result in the best server selection for all of the clients and it may prevent some clients from joining a match offer that they could have joined if a different server had been selected. This is clearly the case if network latency is one of the important properties of a network link. With early binding, a qualified server with the lowest communications latency to the client creating the match offer will be chosen. This latency may be far lower than the latency required by the match offer. The latency requirement of the match offer creates a virtual "sphere" around the chosen server. Clients that match the attributes of the match offer that are within the latency sphere centered around the chosen server will be able to join the match offer. Depending on the location in latency "space" of other qualified servers and other clients, another server may be a better choice that will not only allow the creator of the match offer, but more clients than the original server choice.

Server late binding eliminates this issue, but is more complex. With server late binding the network match maker maintains a pruned list of qualified servers for a match offer. The clients join the match offer in the usual way. The attributes of the new client are first compared to those of the match offer. If they match, the properties of the network links are compared. The match maker compares the properties of the network links between the new client and the member clients of the match offer to the instance attributes of the match offer. If they match, the properties of the network links between the client and the pruned list of servers is compared to the instance attributes of the match offer. If one or more of the communications links between the new client and the pruned list of servers meet the requirements of the match offer the client is allowed to join it. The network match maker then prunes the list of servers associated with the match offer to eliminate any for which the properties of the communications link from the new client to the server did not meet the instance attributes of the match offer. This will guarantee that the existing clients that are members of the match offer will continue to meet the requirements of the match offer. When the moderator finally chooses to launch the game, there may be more than one server in the pruned server list. The network match maker will select a final server using a selection criteria that it chooses. Typically this selection criteria will choose the server with the best overall communications properties to all of the client that are members of the match offer. In many network applications, there will be no direct communications between the clients. There will only be communications between the clients and a server. In this case there will be no need to measure properties of the communications links between the clients and so this will not be part of the match making process.

Automatic Matches

Automatic matches are very similar to user created match offers except that the users ask the match maker to create automatic match offers to match them with. A user specifies an application to run and requests an automatic match. The network match maker looks at the users requesting an automatic match of the same application and attempts to organize them into matched sets. The match maker creates automatic match offers to which it matches the clients. As part of creating an automatic match, the user may be given the ability to specify modifications to the attributes of the automatic match offer instance of an application. As an example a user might ask for an automatic match for a game with only expert players.

When a client requests an automatic match, match maker will compare the client attributes and communications properties of the requester as applicable to the attributes of the existing automatic match offers. If the client attributes and applicable communications properties of the client match an automatic match offer, the client will be entered into the matched set of clients associated with the match offer. If the attributes of a client and applicable communication properties do not match the instance attributes of the automatic match offer, the match maker will move on to the next automatic match offer. This continues until the client has been matched to an automatic match offer, or there are no more automatic match offers. If the new client has failed to match any of the automatic match offers, the network match maker creates a new automatic match offer and joins the new client with it. When a particular automatic match offer contains enough clients as required by the attributes, the match maker causes an instance of the application to be launched. The network match maker will also support a reasonable time-out period for the launching of automatic match offers.

The particular cases of peer-to-peer, multiple clients to single server and multiple clients to multiple servers are all handled in this frame work as they would with user created match offers. A final detail of automatic match offers is that users that are manually browsing match offers will also see and be able to join the automatic match offers.

Examples of Communications Attributes

The most important communications attributes are bandwidth, latency and packet loss rate. Other attributes of communications networks may be important in some applications, but these are the most broadly important attributes. Below are examples of how these attributes would be used by the match maker for matching clients and servers to a match offer. For the purposes of these examples, the discussion here relates only to how the communications attributes are used in the match making process. The other client and server attributes will be ignored.

Bandwidth is the data rate that can be supported by a particular network link. Networked applications will have requirements for the data rates that they need to send between clients or between clients and a server. Consider as an example an application that be operated with or without speech communications between the clients. When used with digital speech, the speech data consumes a significant amount of data bandwidth. Further consider that the application is a peer-to-peer application with no need for a server. In this example, a user creates a match offer for this application and sets an instance attribute for this match offer to enable speech communications. When a new client requests to join the match offer, the match maker will ask the new client to measure the bandwidth between the new client and all of the clients that are already members of the match offer. If the bandwidth between the new client and any one of the existing members of the match offer is too low to support the bandwidth requirements of the application when speech is enabled, the match maker will see that the client attributes for communications bandwidth to one of the existing clients does not match the instance attributes of the match offer for client-to-client communication bandwidth. The new client will therefore be prevented from joining the match offer. The same client may be allowed to join a match offer for the same application when the match offer instance specifies that client-to-client speech is not enabled. This will be true if the match offer instance attributes for client-to-client bandwidth are equal to or lower to the bandwidth from the new client to each of the existing client members of the match offer.

Latency is another important communications attribute. Latency is the time for a communications data to travel over a network link from one system to another. Many interactive applications will have strict requirements for communications latency that if not met will prevent the application from operating properly. Total latency on a communications link will be the sum of many factors including the propagation time of signals over long distances. The other factors can generally be minimized or reduced, but propagation delays are set by physical laws. Imagine a highly interactive game that is played between multiple clients through a server. Each client in a game instance sends and receives its communications data to the other clients through the server. In this example, also consider that the pool of potential clients to play the game are spread over a wide geographic area and that there are multiple servers also spread through the same area. The example game has strict latency requirements for the communications delay between the clients and a server used for a game instance. If the latency between a client and the server exceed this, the quality of the game play for the client or all of the clients in the game instance may be unacceptable. In this example, the match maker must not only match clients together into matched sets, but it also must match each matched set of clients to a specific server. As described earlier there are two methods of matching the server to a group of clients: early server binding and later server binding. With early server binding, the match maker will choose the server that has the lowest measured latency to the first client in the match offer. As each new client attempts to join the match offer, the match maker will ask the client to measure its latency to the server that has been selected for the match offer. If the measured latency meets the requirement of the match offer instance for latency, the new client will be allowed to join. The end result is that all of the clients that join the match offer will meet the requirements for latency of the match offer instance. With server late binding, when the match offer is initially created, the match maker will create a list of all of the servers that match all of the instance attributes of the match offer. As clients join the match offer, the match maker will ask the clients to measure their latency to each of the servers in the list. The new client will provide this vector of measured latencies to the match maker. Each latency in the vector will be compared to the latency attribute requirements of the match offer. If one or more the latency vector elements meet the latency requirements of the match offer, the new client will be allowed to join it. The match maker will then prune from the server list associated with the match offer any servers whose corresponding latency vector elements for the new client did not meet the requirements of the match offer. Once all of the desired clients have joined the match offer, there may be more than one server that are in the pruned list. The match maker will then use some criteria to select a single server. One criteria would be to choose the server that minimized the average latency between that server and all of the clients. Another criteria would be to minimize the latency differences between each of the clients and the server.

In a well managed network, most of the latency between two points in the network will come from the network propagation time. In both the early and late server binding cases, this will mean that the clients will tend to be matched to servers that are located near to them in the network. If the network tends to minimize the lengths of the network connections, this will result in clients being matched to servers in their geographical vicinity.

Packet loss rate, is the rate at which data is lost during transmission in a network. Most networks transmit data in discrete units called packets or frames. Some networking protocols such as UDP do not provide guaranteed data delivery so it is up to the application to either be tolerant of transmission loss or provide a means to retransmit the data. Other networking protocols such as TCP/IP do provide guaranteed delivery. However, when a packet is lost this must be signaled to the sender and the transmission retried. Unfortunately, this takes time and introduces a large delay before the lost packet can be recovered. In some applications, this delay causes more problems than the loss of the data. Therefore, many interactive applications will have requirements for maximum tolerated packet loss rates. This then becomes an important attribute of a network link that an application may want the match maker to consider as part of matching clients to a match offer and a server to matched set of clients. This attribute will be used in a similar fashion to the other network attributes.

Generalizations to the invention

The previous discussion of client-server applications only considers the cases where this is only a single server or the match maker chooses a single server from multiple servers to match to a match offer. It is also possible in the case where there are multiple servers that the application may require multiple servers. Consider an application that has two forms of data that it transmits through the network. As an example consider an interactive game that supports speech communications between players. It will transmit game information and user speech data that it separates into two separate data streams that flow between the clients and two different servers. One server will handle the game data while the other the speech data. This allows the server that handles the speech data to be equipped with special capabilities specific to processing the speech data prior to routing it to the clients that are to receive it.

With this arrangement, the application will require two servers, each with unique attributes. Since the game data and speech data will have different bandwidth, latency and packet loss requirements, the application will have separate requirements for each of the two data streams. This will mean that there will be two sets of application attributes for properties of the network links between the clients and the servers. During the match making process in this example, the match maker will ask a client requesting to join a match offer to measure the properties of the network links from the client to each of the two servers. For the client to be allowed to join the match offer, both sets of network properties must match the instance attributes of the match offer for the application requirements for each of the network links from a client to the two servers.

In the prior discussions it has been assumed that once a sufficient number of clients have joined a match offer for an application that the application is launched with all of the clients that have successfully joined the match offer. The launch may be triggered by a moderator in a user created match offer or may be triggered by the match maker when enough clients have been matched to an automatic match offer.

There is another important case of a persistent application. This is an application that allows clients to join and leave it during its operations. In this case, the game may be launched by a single client or automatically by the match maker. In this case, the running application also embodies a match offer. If the application requires a server or servers, they are chosen at the time that the application is launched. The server is chosen based on its attributes and the required attributes of the application. When a client requests to join the running application, the attributes of the client are compared to the required attributes of the application. The properties of the appropriate network links are measured and matched to the required network attributes of the application. If all matches, the new client is allowed to join the running application. At a later time the client may leave the application. This situation is the same as clients joining a match offer with early server binding.

DESCRIPTION OF AN EMBODIMENT OF THE INVENTION

Although the above description of the present invention is entirely enabling of the invention generally and of this embodiment in particular to a practitioner ordinarily skilled in the arts, as an aid to more quickly understanding the invention it is useful to consider in some detail an embodiment that contains only a relatively small subset of the invention and which is therefore relatively simple to describe and also is relatively quick and easy to understand.

The present embodiment relates to matchmaking for Peer to Peer games that is to say games that play without the use of any Servers even though the matchmaker is itself implemented as at least one Server. The network that this particular embodiment uses is the well known Internet which uses the also well known Internet Protocols (such as TCP/IP and UDP/IP). Moreover, for simplicity since the present embodiment is described only by way of illustration of the above described invention, only a relatively few of the possible alternatives are incorporated into this particular embodiment.

The term computer program is commonly abbreviated to program. A matchmaker server program is used, an executing instance of this program (abbreviated to MM) resides on a server computer. The concepts of server computers and executing instances of programs are well known in the computing arts. Each computer user (abbreviated to user in this embodiment) launches an instance of a client computer program on his computer which computer is then a client computer for the time being.

Referring to FIG. 1, in step 11, an instance of a client program (CL1) sends a request to the MM, the use of message exchanges by means of Internet communications to send requests is well known in the data communications and computing arts. The request asks the MM to create a game offer and the request includes attributes of the various game and match preferences chosen by the user together with intrinsic attributes of the requested type of game and attributes of the hardware and software installed on the user's computer. The intrinsic attributes of the game include limiting values for communications attributes of links between users' computers. In step 12, the MM receives this request. A well known intrinsic feature of the Internet Protocol (IP) used by CL1 to send a request to the MM, is that all messages carry a return unique network address in the form of an Internet Protocol address (IPaddr.) exploiting which the MM can subsequently send a reply data message to the CL1, this eliminates any need for the CL1 to embed an address within the request as might be needed on other types of network or link. In step 13 the MM creates a record to represent game offer (GOR1) which contains the attributes from the request and the return unique network address of CL1. Records, sets of records and techniques for creating and maintaining them are well known in the computer programming art. In step 14 the MM sends a reply back to CL1 notifying CL1 that the match is not yet complete (step 14'). In step 15 CL1 waits for a request from MM. CL1 thus becomes the first member of a game match yet to be completed. In step 16 the MM makes the contents of the game offer record available to other potential users. In step 17 MM waits for further requests from other clients.

Figure 2:
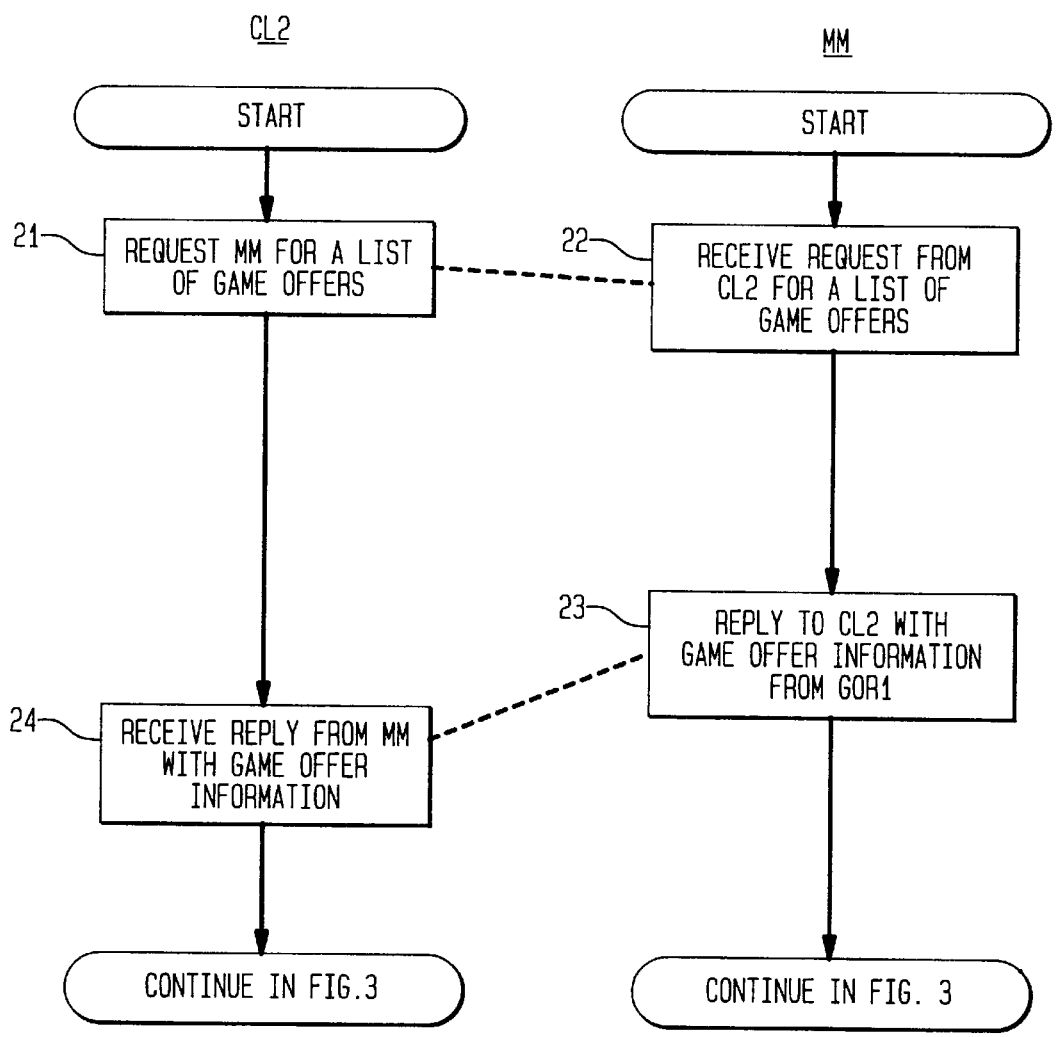
FIG. 2 is a flow chart showing the interaction between a second client and a match maker in accordance with the present invention.

Referring to FIG. 2, in step 21, another instance of a client program (CL2) which is executing on a different user's computer from CL1 and also a different computer from MM, sends a request for a list of game offers to the MM. In step 22 the MM receives this request. In step 23 the MM responds with information extracted from GOR1 that was created in step 13. In step 24 CL1 receives the response from MM which contains the game offer information from GOR1.

Figure 3:
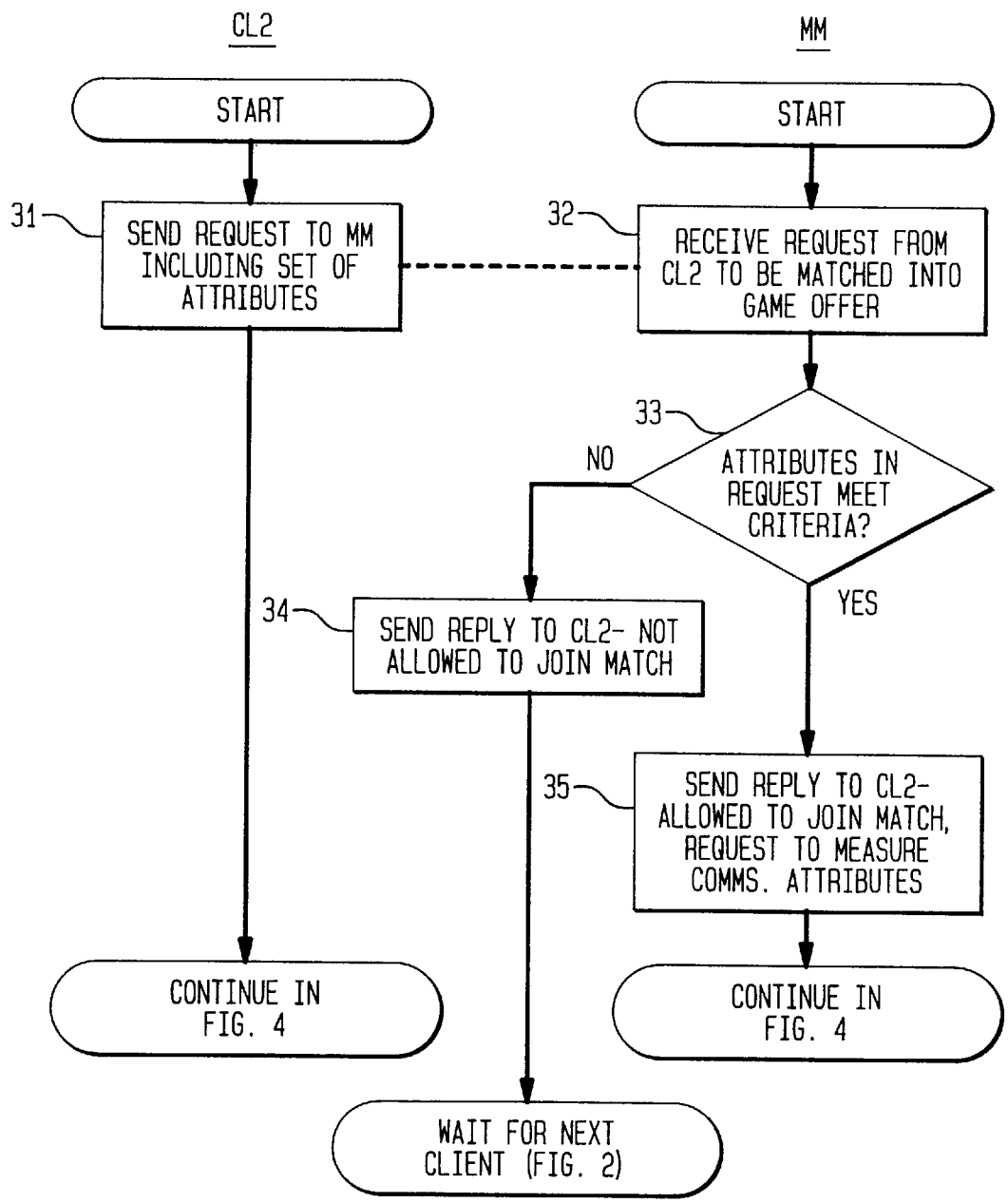
FIG. 3 is a flow chart showing the interaction between clients and the match maker of FIGS. 1 and 2 in accordance with the present invention.

Referring to FIG. 3, in step 31, CL2 sends to MM a request to be matched into the offer represented by GOR1. In step 32 the MM receives this request In step 33 the MM compares the attributes in the latest request sent by CL2 with those in GOR1 and if they do not match by whatever criteria the MM is programmed to use then CL2 is sent a message from MM that informs CL2 that it cannot join the offer represented by GOR1, at least not at this time (step 34). The use of programmed criteria to match requirements and sets of requirements is well known in the computer programming art. Assuming the attributes match, in step 35 the MM sends to CL2 a request to measure the communications attributes between CL1 and CL2.

Figure 4:
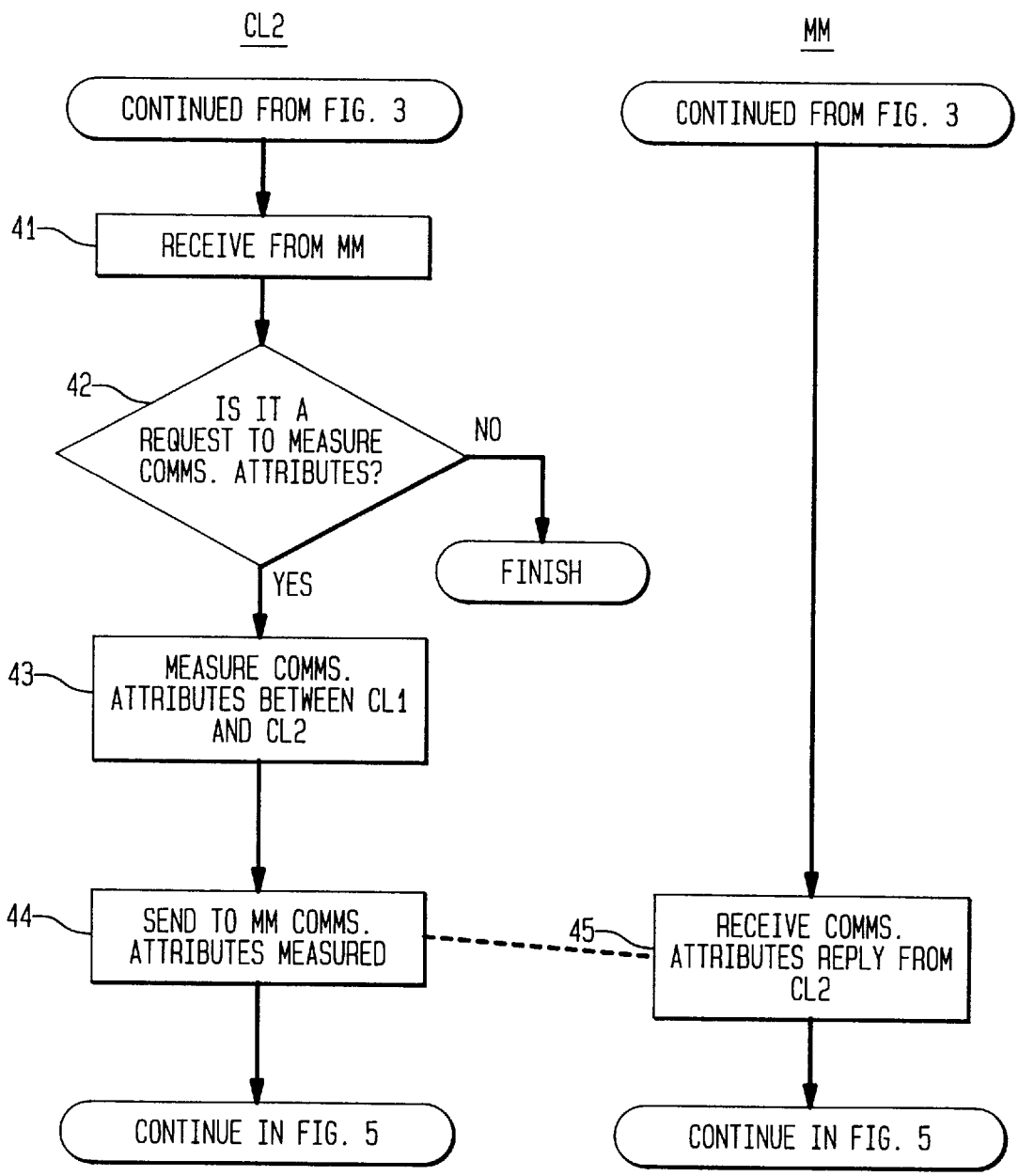
FIG. 4 is a flow chart showing measurement of communication attributes in accordance with the present invention.

Referring to FIG. 4, in step 41, CL2 receives the latest described request from MM. In step 42 a determination is made by CL2 as to whether the request is a request to measure communications (comms.) attribute or is a rejection. In step 43 CL2 measures the communications attributes of the data communications link between CL2 and CL1. Methods of measuring communications attributes are well known in the arts. Not all communications attributes are mutually orthogonal, though the especially important ones of latency, bandwidth and packet loss rate are indeed substantially orthogonal. For example, CL2 could measure a data throughput rate attribute directly or CL2 could measure latency, bandwidth and packet loss rate separately and then calculate data throughput rate to a reasonable degree of accuracy (limited inter-alia by mensuration precision) from those three attributes by methods well known in the data communications arts. Another communications attribute is best case round trip time for a kilobyte sized message, this attribute is a function of latency, bandwidth and as a second order effect computer speed but is entirely independent of packet loss rate. Round trip times and methods of measuring them are also well known in the arts. In step 44 CL2 reports the results of measuring the attributes of the data communications link between CL2 and CL1 back to MM. In step 45 MM receives the message reporting the results of the comms. attribute measurement.

Figure 5:
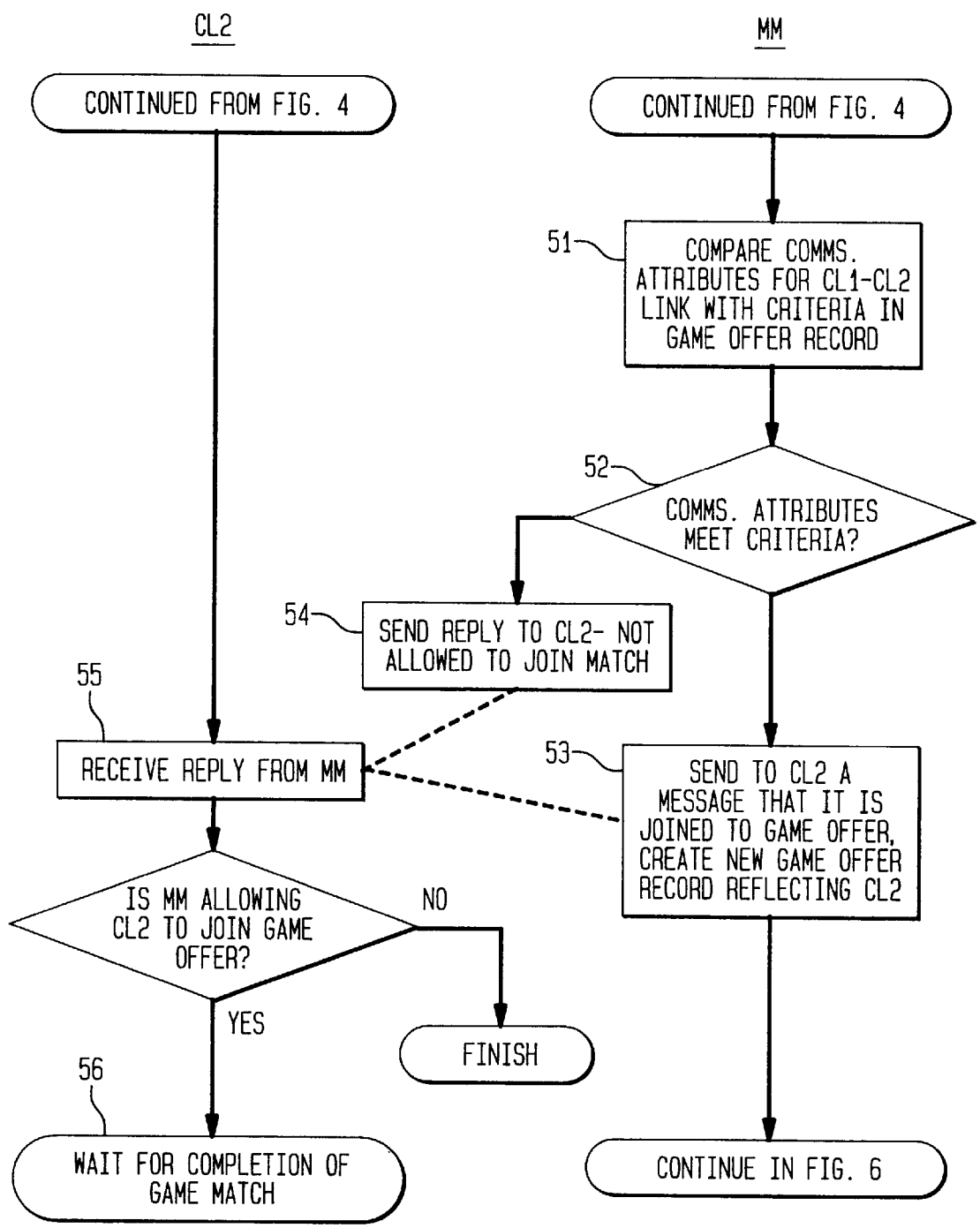
FIG. 5 is a flow chart showing the steps in matching in accordance with the present invention.

Referring to FIG. 5, in step 51, the MM compares the communications attributes with the limiting values for communications attributes for the game recorded in GOR1 (or some predetermined default values for any limiting values for communications attributes absent from GOR1) and if (step 52) the communications attributes exceed any limiting values for communications attributes specified in GOR1 (or, in their absence predetermined defaults) according to programmed criteria then in step 53 MM notifies CL2 that it is allowed to join the game offer and a further game offer record (GOR2) is created to record all the known attributes associated with CL2. Otherwise (step 54) CL2 is sent a message from MM that informs CL2 that it cannot join the offer represented by GOR1 (step 55). If not allowed to join, CL2 finishes. If allowed to join, CL2 waits for completion of a game match (step 56).

Figure 6:
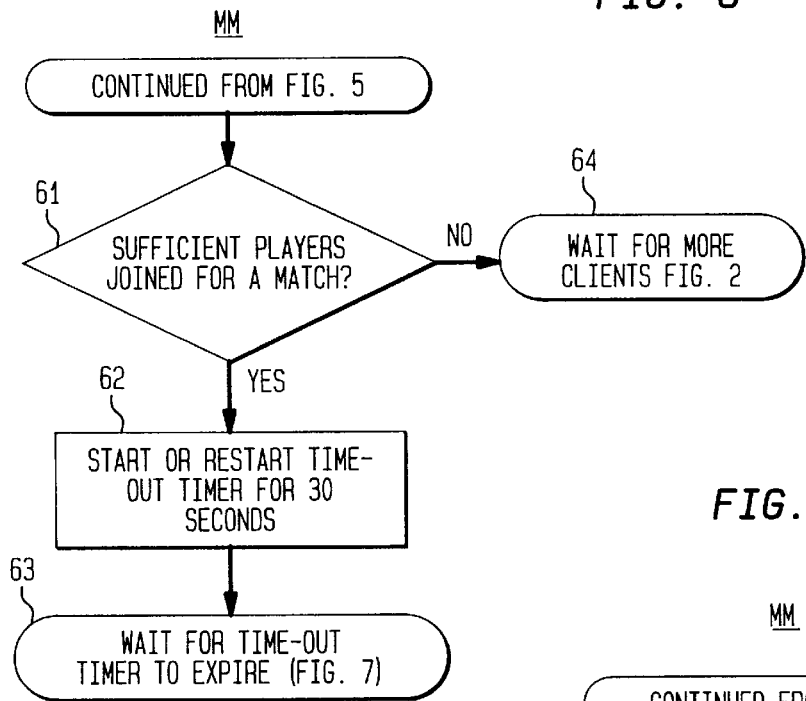
FIG. 6 and 7 are flow charts showing termination methods in accordance with the present invention.

Referring to FIG. 6, the MM must next determine whether or not the game match is complete. One vital criterion is whether sufficient players are joined into the game offer (step 61). This embodiment uses the automatic match approach, so if a sufficient number of instances of client programs are joined then a time-out timer is started (step 62) for a predetermined interval such as 30 seconds during which time further clients may join the game provided the maximum allowed number is players is not reached (step 63). Time-out timers are well known in the computer programming art. If a sufficient number of players is not yet joined then the time-out timer is not started yet and MM waits for more client (step 64).

Until and unless the time-out timer expires further instances of client programs (CL3, CL4 etc) may join the game offer upon the same basis of negotiation as CL2 used, with the exception that the third and later clients (CLn) will be requested and required by the MM to measure and report back the communications attributes between the candidate instance of client program and all of the clients already joined (CL1 through CL(n-1)).

Figure 7:
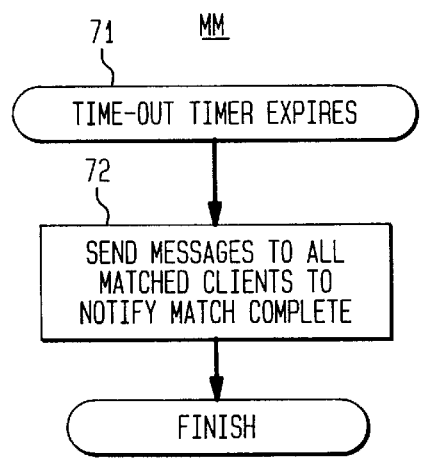

Referring to FIG. 7, in step 71, when and if the time-out timer expires MM deems the game matched and sends messages to each of the clients (CL1 through CLn) to inform them of the successful completion of the game match. Otherwise MM takes no particular action in connection with the time-out timer (step 72). Upon receipt of the message informing them of the successful completion of the game match, each player's computer starts executing the game program instructions and each makes game data message exchanges between each user computer upon a Peer to Peer basis. At this point communication between the clients and the MM (which is a server) is no longer essential and gameplay proceeds.

DESCRIPTION OF A FURTHER EMBODIMENT OF THE INVENTION

By way of further illustration the present embodiment is an example subset of the general description of the present invention, the subset being directed to matchmaking for a game that uses multiple clients to a single server with early server binding. The network that this particular embodiment uses is again the well known Internet. The above general description of the present invention is entirely enabling of the invention generally and of this embodiment in particular to a practitioner ordinarily skilled in the arts.

A matchmaker server program is used, an executing instance of this program (abbreviated to MM) resides on a server computer. Each computer user (abbreviated to user in this embodiment) launches an instance of a client computer program on his computer which computer is then a client computer.

Figure 8:
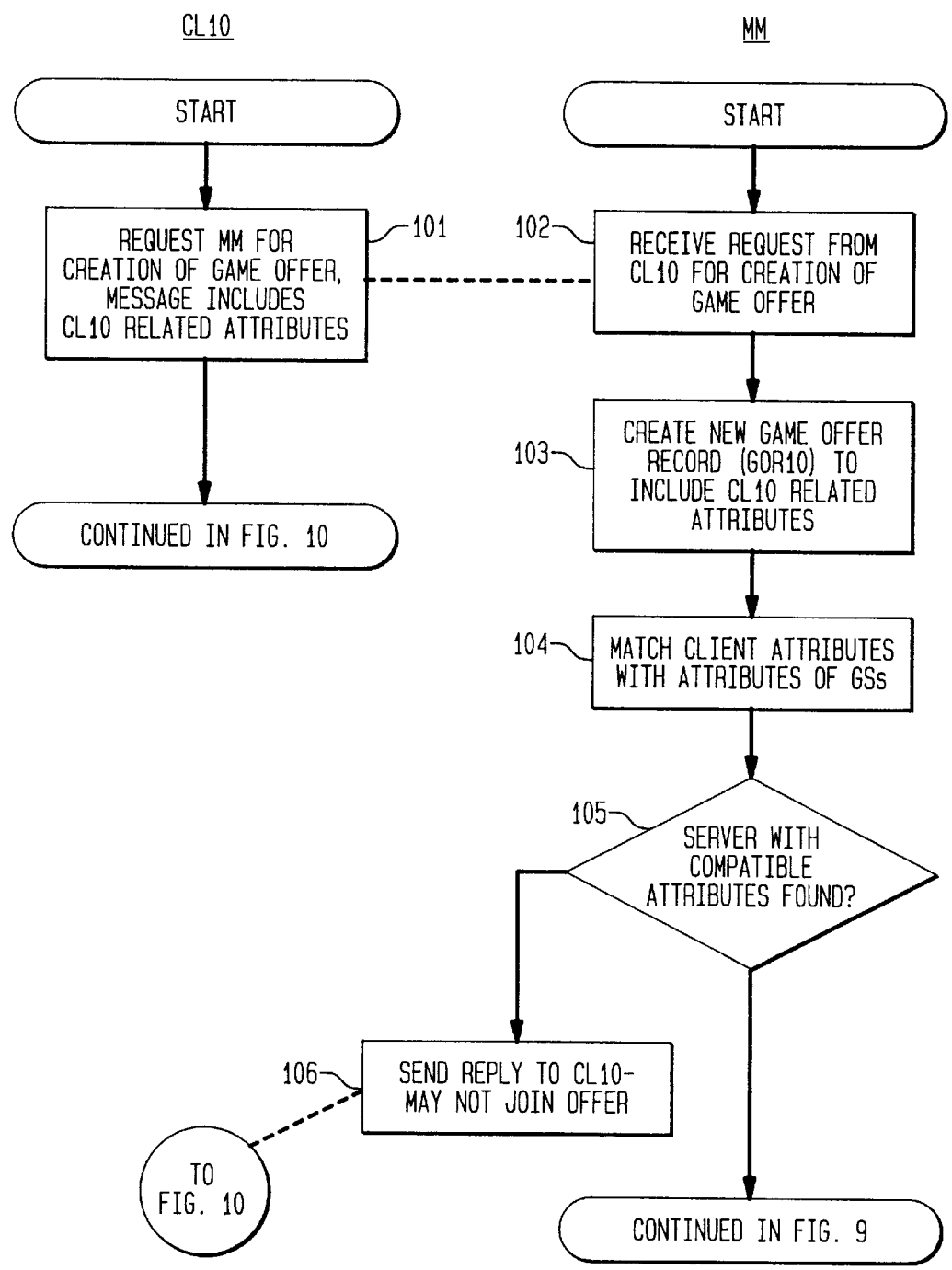
FIG. 8 is a flow chart showing the interaction of clients, servers and a match maker in accordance with the present invention.

Referring to FIG. 8, in step 101, an instance of a client program (CL10) sends a request to the MM. The request asks the MM to create a game offer and the request includes attributes of the various game and match preferences chosen by the user together with intrinsic attributes of the requested type of game and attributes of the hardware and software installed on the user's computer. The intrinsic attributes of the game include limiting values for communications attributes of links between clients and game servers (GSs). In step 102, the MM receives this request. In step 103 the MM creates a game offer record (GOR10) which contains the attributes from the request and the return unique network address of CL10. In step 104 MM matches the attributes recorded in GOR10 with the attributes (if any) that game servers (GSs) have, at their own initiative, previously reported to MM and which MM retained in records created for this purpose. In the case that this matching of game server (GS) attributes to the attributes recorded in GOR10 fails to identify a GS for which the attributes match GOR10 adequately according to programmed criteria (step 105) then CL10 is sent a message from MM that informs CL10 that CL10 cannot join the offer represented by GOR10 (step 106).

Figure 9:
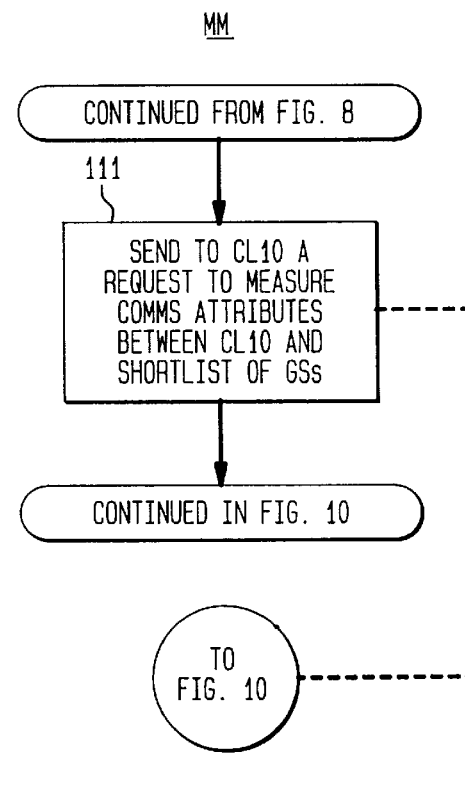
FIGS. 9–10 are flow charts showing the use of communication attributes in accordance with the present invention.

Referring to FIG. 9, in step 111 the MM sends to CL10 a request to measure the communications attributes between CL10 and each of a shortlist of computers identified by the unique network addresses of all of the potentially compatible GSs identified by MM in step 104 above.

Figure 10:
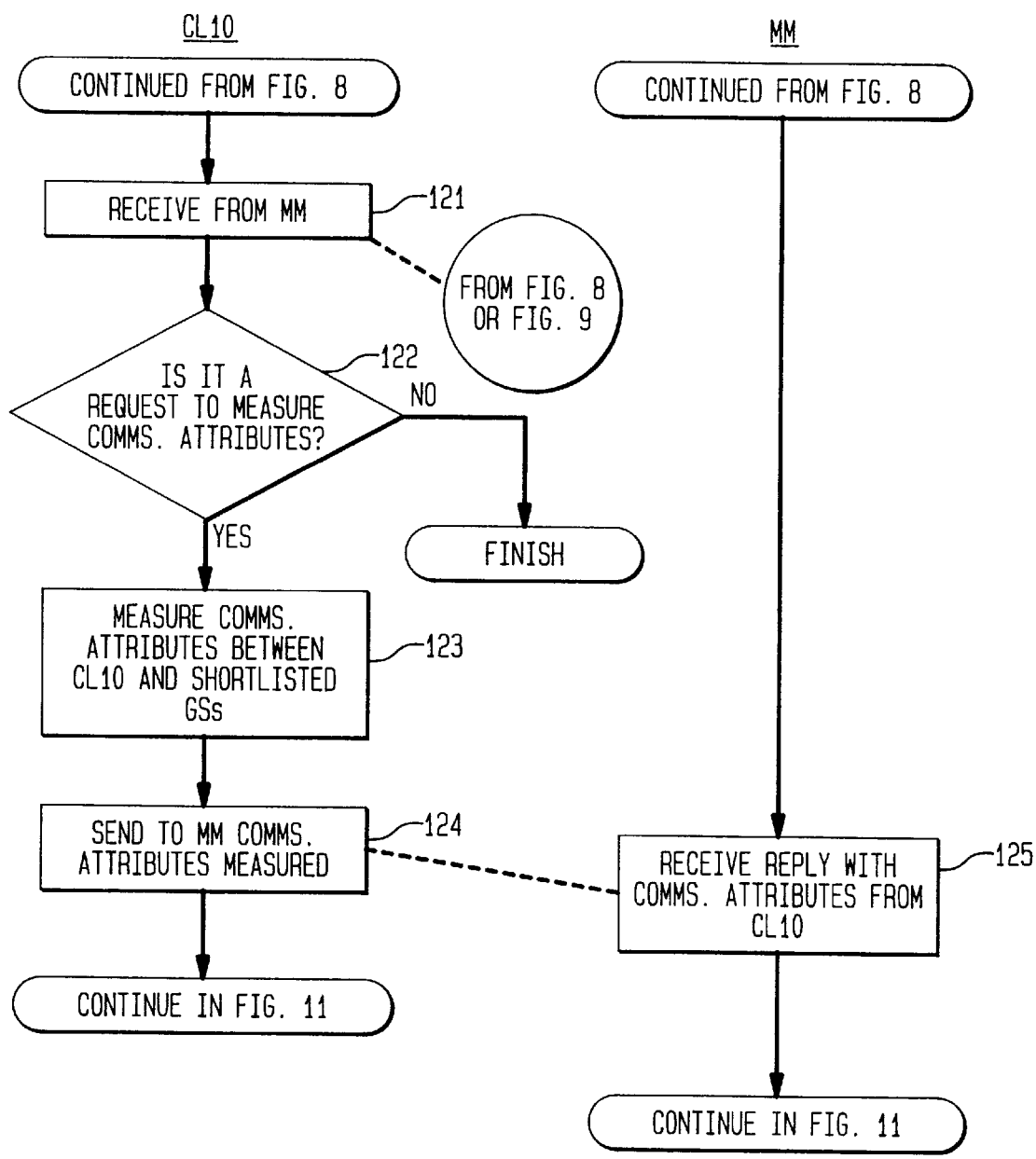

Referring to FIG. 10, in step 121, CL10 receives one of the latest described requests from MM. In step 122, a determination is made by CL10 as to whether the request is a request to measure communications attributes or is a rejection. If a rejection, then CL10 finishes. Otherwise, in step 123 CL10 measures the communications attributes of each of the data communications links between CL10 and the shortlisted GSs. In step 124 CL10 reports the results of measuring the various communications attributes back to MM. In step 125 the MM receives this report.

Figure 11:
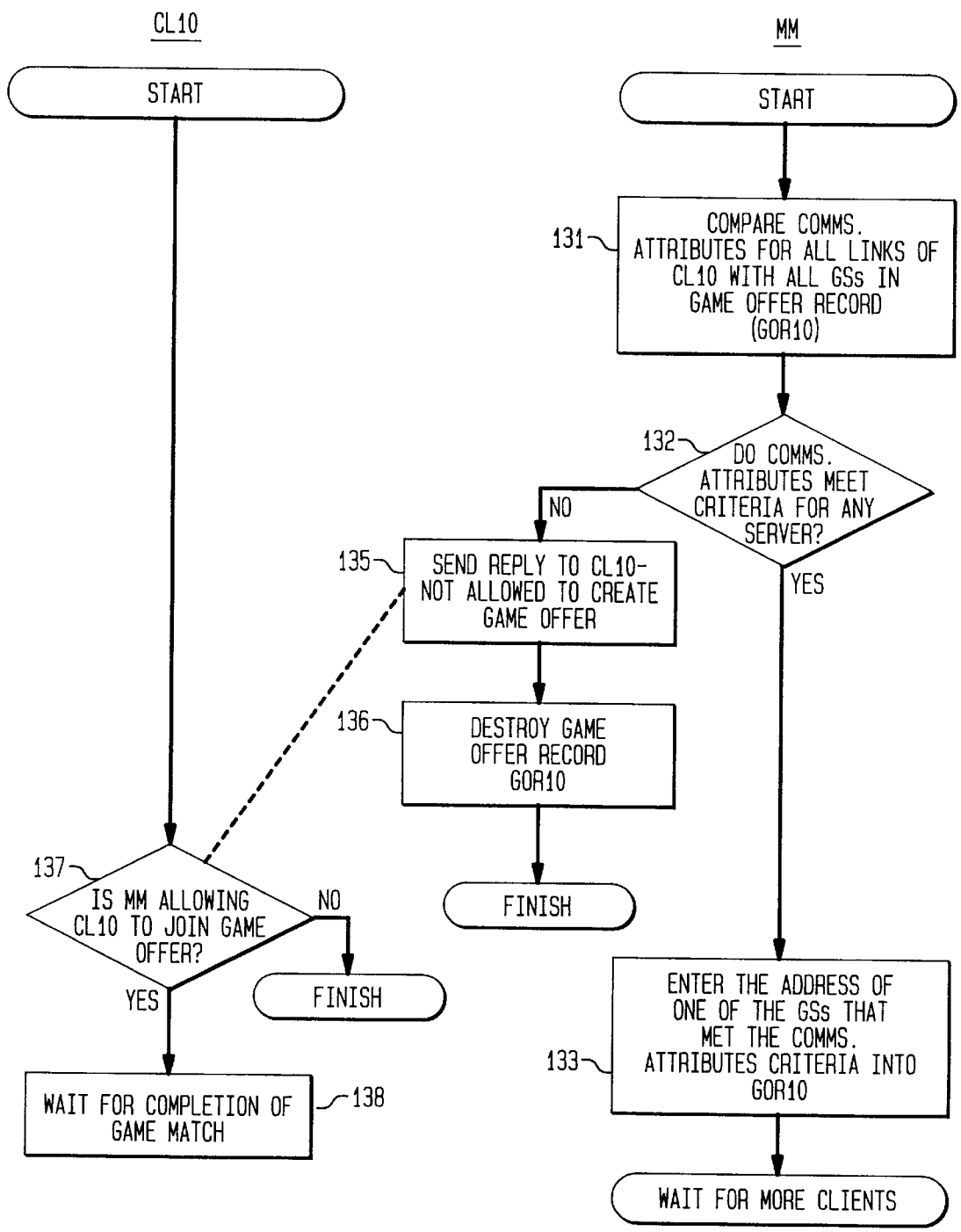
FIG. 11 is a flow chart showing the matching operation of the match maker in FIG. 8.

Referring to FIG. 11, in step 131, the MM compares the communications attributes (for each path between CL10 and each of the GSs reported on) with the limiting values in GOR10 (or some predetermined default values for communications attributes absent from GOR10) and if the communications attributes exceed the limiting values according to programmed criteria specified in GOR10 or, in their absence predetermined defaults (step 132) then in step 133 CL10 is allowed to create a valid game offer by recording the unique network address of one of the qualifying servers in GOR10. This is termed early server binding. The server so selected (in step 133) is termed the early bound game server (EBGS). If no qualifying server is found then CL10 is sent a message from MM that informs CL10 that MM cannot create a game offer (step 135) and GOR10 is destroyed (step 136). Methods for destroying records are well known in the arts.

At CL10, a determination is made as to whether MM has allowed CL10 to join game offer (step 137). If CL10 is allowed, then CL10 waits for completion of game match (step 138). Otherwise, if not allowed to join, CL10 finishes.

When further clients attempt to join the game offer represented by GOR10, they are requested by the MM to measure the communications attributes only between themselves and the EBGS. On reporting these communications attributes back to MM a determination is made as to whether those attributes exceed the limiting values according to programmed criteria established above so that the client may be allowed to join the game offer.

This embodiment does not use the automatic match approach, so MM informs CL10 of the progress of the match as each client joins. When the user of CL10 is satisfied that a sufficient number of players have joined the match then the user of CL10 can stimulate CL10 to send a message commanding MM to treat the match as completed. User stimulation of programs through means such as (for example) keyboards or computer mice is well known in the computer programming arts. The MM then sends each client a message informing the client of the completion of the match.

Upon receipt of the message informing them of the successful completion of the game match, the each player's computer starts executing the game program instructions and makes game data message exchanges between the each user's computer and EBGS. At this point communication between the clients and the MM is no longer essential and gameplay proceeds.

DESCRIPTION OF A STILL FURTHER EMBODIMENT THE INVENTION

By way of further illustration the present embodiment is an example still further subset of the general description of the invention, this subset being directed to matchmaking for a game that uses multiple clients to multiple servers with late server binding. The network that this particular embodiment uses is again the well known Internet. The general description above is entirely enabling of the invention generally and of this embodiment in particular to a practitioner ordinarily skilled in the arts.

When a matchmaker server program is used, an executing instance of this program (MM) resides on a server computer. Each computer user (user) launches an instance of a client computer program on his computer which computer is then a client computer.

An instance of a client program (CL20) sends a request to the MM. The request asks the MM to create a game offer and the request includes attributes of the various game and match preferences chosen by the user together with intrinsic attributes of the requested type of game and attributes of the hardware and software installed on the user's computer. The intrinsic attributes of the game include limiting values for communications attributes of links between clients and game servers (GSs). Next the MM receives this request. The MM creates a game offer record (GOR20) which contains the attributes from the request and the return unique network address of CL20. Then MM matches the attributes recorded in GOR20 with the attributes (if any) that game servers (GSs) have, at their own initiative, previously reported to MM and which MM retained in records created for this purpose. In the case that this matching of game server (GS) attributes to the attributes recorded in GOR20 fails to identify a sufficient number of GSs (the number required is one of the attributes passed by CL20 to MM) for which the attributes match GOR20 adequately according to programmed criteria then CL20 is sent a message from MM that informs CL20 that it cannot join the offer represented by GOR20.

Next the MM sends to CL20 a request to measure the communications attributes between CL20 and each of a shortlist of computers identified by the unique network addresses of all of the potentially compatible GSs previously identified by MM.

Then CL20 receives the latest described request from MM. CL20 measures the communications attributes of each of the data communications links between CL20 and the shortlisted GSs. CL20 reports the results of measuring the various communications attributes back to MM.

The MM compares the communications attributes (for each path between CL20 and each of the GSs reported on) with the limiting values in GOR20 (or some predetermined default values for communications attributes absent from GOR20) and if the communications attributes exceed the limiting values according to programmed criteria specified in GOR20 (or, in their absence predetermined defaults) then MM creates for CL20 a valid game offer by recording all the unique network addresses of all of the qualifying servers in GOR20.

The network addresses in this list of unique network addresses is necessarily a subset of the shortlist referred to above.

The servers to be bound into the match are not yet selected because this embodiment uses late server binding.

If an insufficient number of qualifying servers are found then CL20 is sent a message from MM that informs CL20 that MM cannot create a game offer and GOR20 is destroyed.

When further clients attempt to join the game offer represented by GOR20, they are requested by the MM to measure the communications attributes between themselves and all of the servers listed in GOR20 as qualifying.

On reporting these communications attributes back to MM a determination is made as to whether those attributes exceed the limiting values for a sufficient number of servers according to programmed criteria established above so that the client may be allowed to join the game offer. If the client is allowed to join the game offer then any servers for which the communications attributes of the further client fail to meet criteria are removed from the list of qualifying servers in GOR20. Thus the list of qualifying servers may become smaller and smaller as more clients join the game offer.

This embodiment does not use the automatic match approach, so MM informs CL20 of the progress of the match as each client joins. When the user of CL20 is satisfied that a sufficient number of players have joined the match then the user of CL20 can stimulate CL20 to send a message commanding MM to treat the match as completed. At this stage the MM selects the GSs to be bound into the match. The servers most likely to result in good gameplay are chosen according to programmed criteria and other factors including all the reported communications attributes. This is known as late server binding. The MM sends to each server a notification that the match is complete together with a list of the addresses of the servers selected.

Upon receipt of the message informing them of the successful completion of the game match, the each player's computer starts executing the game program instructions and makes game data message exchanges between the each user's computer and each bound server. At this point communication between the clients and the MM is no longer essential and gameplay proceeds.

It is to be understood that even though numerous embodiments and advantages of the present invention have been set forth in the foregoing description, the above disclosure is illustrative only, and changes may be made in detail yet remain within the broad principles of the invention. Therefore, the present invention is to be limited only by the appended claims.

What is claimed is:

1. A method for creating a set of computer objects, said set of computer objects comprising a plurality of client instances of client computer programs together with a server instance of a server computer program selected from a set of server instances, the method comprising the steps of:
   (a) receiving from a first client instance a first request to be joined into said set of computer objects, said first request comprising first client attributes associated with said first client instance;
   (b) selecting a first server subset of said set of server instances in response to said first request based on said first client attributes;
   (c) creating said set of computer objects consisting of said first client instance;
   (d) augmenting said set of computer objects with a second client instance of a client computer program, comprising the steps of:
      (I) receiving from said second client instance a second request to be joined into said set of computer objects, said second request comprising second client attributes associated with said second client instance.
      (ii) removing from said first server subset a second server subset in response to said second request based on said second client attributes, and
      (iii) adding to said set of computer objects said second client instance; and
   (e) adding to said set of computer objects a member of said second server subset based on attributes associated with each member of said set of computer objects.

2. The method of claim 1, wherein one of said client attributes relates to capabilities of a computer system executing a corresponding one of said client instances.

3. The method of claim 1, wherein one of said client attributes relates to characteristics of at least one user using a corresponding one of said client instances.

4. The method of claim 1, wherein said client attributes include communication attributes of a network link associated with a computer system executing a corresponding one of said client instances.

5. The method of claim 4 wherein one of said communication attributes is bandwidth of said network link.

6. The method of claim 4 wherein one of said communication attributes is latency of said network link.

7. The method of claim 4 wherein one of said communication attributes is packet loss rate of said network link.

8. The method of claim 1 wherein one of said server attributes relates to capabilities of a computer system executing a corresponding one of said server instances.

9. The method of claim 1 wherein one of said server attributes relates to current load of a computer system executing a corresponding one of said server instances.

10. The method of claim 1 further comprising the step of finding an instance of a server computer program from said set of computer objects that minimizes average latency between instances of server computer programs and instances of client computer programs belonging to said set of computer objects.

11. The method of claim 1, further comprising the step of:
   repeating said augmenting step to add a predetermined number of client instances to said set of computer objects.

12. The method of claim 11, further comprising the step of:
   repeating said augmenting step to add client instances to said set of computer objects for a predetermined time interval.

13. The method of claim 1 wherein said client attributes include multiplayer game attributes.

14. The method of claim 13 further comprising a step of providing a moderator for constructing said game attributes.

15. The method of claim 1, further comprising the step of:
   constructing a set of records, each record of said set of records comprising said server attributes.

16. The method of claim 15, wherein step (b) comprises the step of:
   selecting a record subset of said set of records in response to said first request based on said first client attributes.

17. The method of claim 15, wherein step (ii) comprises the step of:
   removing from said record subset a further subset of said set of records in response to said second request based on said second client attributes.

18. A system for creating a set of computer objects, said set of computer objects comprising a plurality of client instances of client computer programs together with a server instance of a server computer program selected from a set of server instances, the system comprising:
   (a) means for receiving from a first client instance a first request to be joined into said set of computer objects, said first request comprising first client attributes associated with said first client instance;

(b) means for selecting a first server subset of said set of server instances in response to said first request based on said first client attributes;

(c) means for creating said set of computer objects consisting of said first client instance;

(d) means for augmenting said set of computer objects with a second client instance of a client computer program, comprising:

(i) means for receiving from said second client instance a second request to be joined into said set of computer objects, said second request comprising second client attributes associated with said second client instance;

(ii) means for removing from said first server subset a second server subset in response to said second request based on said second client attributes; and (iii) means for adding to said set of computer objects said second client instance; and (e) means for adding to said set of computer objects a member of said second server subset based on attributes associated with each member of said set of computer objects.

* * * * *